Nov. 14, 1961  W. N. HADLEY  3,008,212
ROTARY SHEARING MEMBER

Filed Aug. 10, 1959  2 Sheets-Sheet 1

Inventor:
Wilfred N. Hadley,
by KENWAY, JENNEY, WITTER & HILDRETH
Attorneys

Nov. 14, 1961  W. N. HADLEY  3,008,212
ROTARY SHEARING MEMBER
Filed Aug. 10, 1959  2 Sheets-Sheet 2
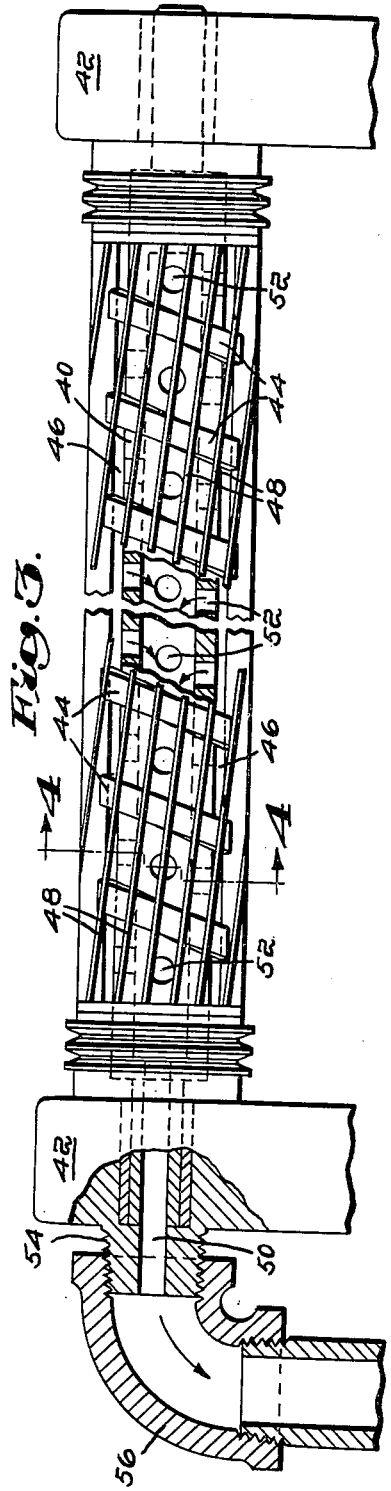
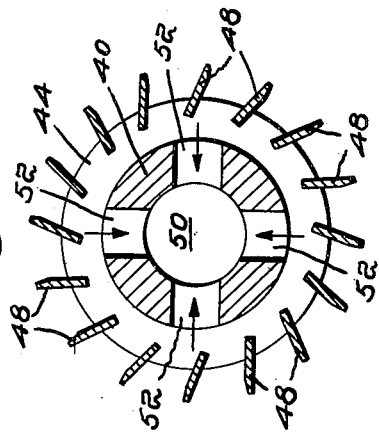
Inventor:
Wilfred N. Hadley,
by KENWAY, JENNEY, WITTER & HILDRETH
Attorney

United States Patent Office 3,008,212
Patented Nov. 14, 1961

3,008,212
ROTARY SHEARING MEMBER
Wilfred N. Hadley, Springfield, Vt., assignor to Riggs and Lombard Inc., Lowell, Mass., a corporation of Massachusetts
Filed Aug. 10, 1959, Ser. No. 832,613
3 Claims. (Cl. 26—15)

This invention relates to rotary shearing members particularly adapted for use in cloth shearing machines. Relatively wide fabrics are fed through these machines and the shearing members shear the surface threads to a uniform length. The uniform shearing of the fibers is greatly facilitated by causing the fibers to stand upright as they pass through the shearing area and a primary object of my invention resides in improved construction facilitating this function and furthermore aiding in removing the flock as it is sheared from the fabric.

The invention relates particularly to a shearing member of the nature shown in Patent 2,606,355, dated August 12, 1952, but which member is by my invention considerably modified to produce increased air draft for lifting the fibers to better shearing position and aiding in removing the sheared flock to produce a superior sheared product.

These and other features of the invention will be best understood and appreciated from the following description of preferred embodiments thereof selected for purposes of illustration and shown in the accompanying drawings in which—

FIG. 3 is a side elevation, partially in section, of a modified construction, FIG. 4 is an enlarged sectional view taken on line 4—4 of FIG. 3, and FIG. 5 is a fragmentary side elevation of a further modified construction.

Figure 1:
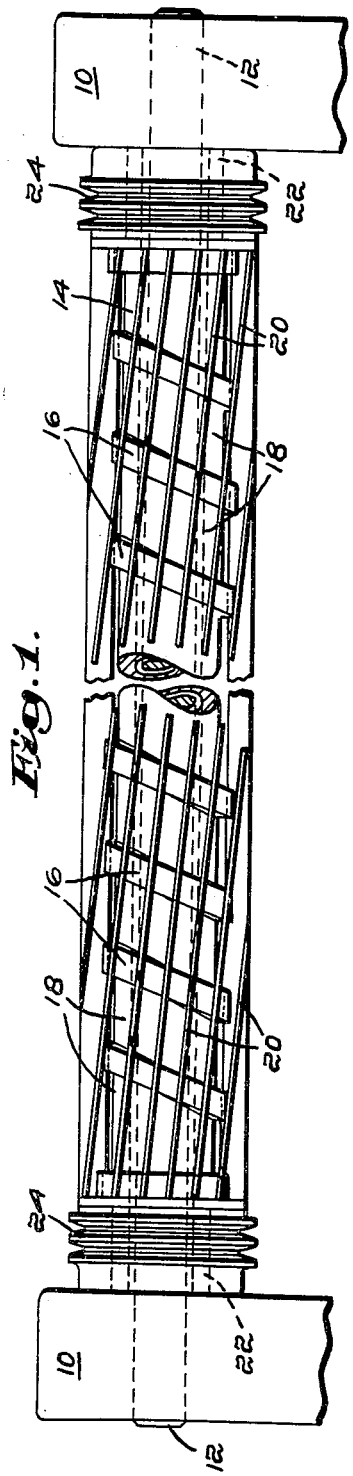
FIG. 1 is a side elevation of a rotary shearing member embodying my invention.
Figure 2:
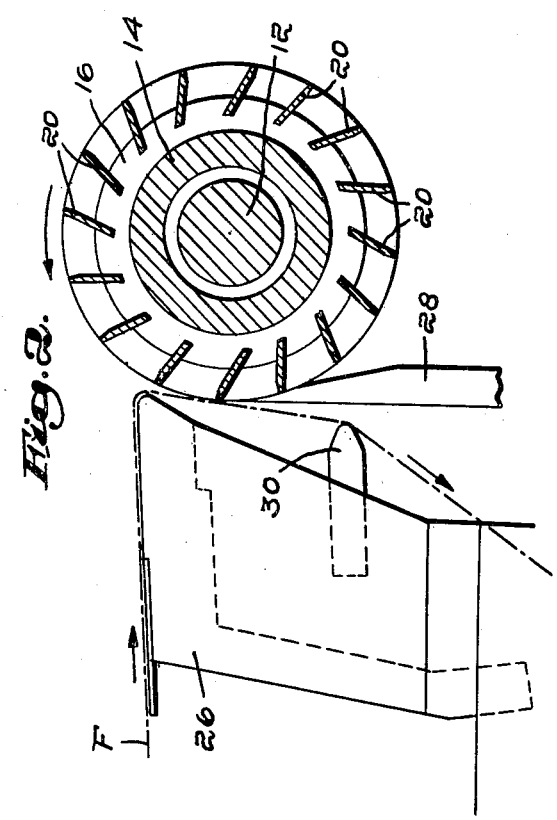
FIG. 2 is a sectional view therethrough together with a cooperating shearing anvil.

Referring first to FIGS. 1 and 2 of the drawings, 10 indicates the two side members of the frame of a cloth shearing machine. A fixed shaft 12 is disposed between and supported at its ends in the members. My improved rotary shearing member 14 is of tubular construction and is rotatably mounted on the shaft 12 between the frame members 10. As illustrated in FIGS. 1 and 2 the tubular member 14 is grooved annularly at spaced areas therealong to provide a plurality of spaced annular risers 16 and spaced annular channels 18 between the risers. Also in accordance with my invention I construct the risers and channels in planes inclined between the longitudinal axis of the member 14 and a radius therethrough as illustrated in FIG. 1. The risers are then slotted to receive shearing blades 20 which are anchored securely within the slots, the slots and blades preferably being disposed helically about the member. The slots are of a depth to give adequate support to the blades and space the blades from the bottoms of the channels 18. The member 14 is supported at its ends for rotation on two bearings 22 and carries two driving pulleys 24 respectively at its ends.

In operation, the fabric F to be sheared is led at a sharp angle over a rest 26 closely adjacent to the cutting edge of a fixed shearing anvil or ledger blade 28 and thence over a cooperating support 30. The shearing member 14 is so rotatably mounted that its blades 20 cooperate with the blade 28 to shear surface threads from the fabric as the taut fabric passes the cutting edge of the blade 28.

It will be understood that the shearing function and its uniform treatment of the fabric are facilitated by lifting the fibers or threads in the shearing area and the spacing of the blades 20 from the bottoms of the channels 18 aids considerably in this function. A primary object of my present invention is further to facilitate this function and produce a more uniform and superior sheared product and, as illustrated in FIG. 1, I accomplish this object by disposing the risers 16 and channels 18 in the inclined angular relation shown. As thus disposed the risers, upon rotation of the member 14, effect a back and forth axial churning of the air in the channels which substantially increases the fiber lifting air draft previously created by the straight risers shown in the above mentioned patent. Such degree of angle inclination can be employed as is found to be most efficient for the shearing operation to be performed.

It will be noted that the inclined risers 16 cause the fiber lifting air draft and the shearing function to continue uniformly along the entire length of the rotary shearing member, whereas the straight risers of said patent remain in fixed position axially and cut off the air draft in the areas thus continually occupied by the risers. It has been found that products sheared by the straight riser construction show streaks in these areas which adversely effect the shade of the product in reflected light. These objectionable areas are entirely eliminated in my improved cutter due to the uniform air draft along the entire length of the cutter and the shearing function is operative over the entire area of the fabric. Another very important feature of the invention resulting from the increased in-draft of air resides in raising the fibres to and supporting them in a position disposed right angularly to the fabric wherein they are cut squarely thereacross. Fibres thus sheared produce a uniform and plush-like finish having bloom and depth of color whereas fibres that are not thus cut, due to lack of such fibre position, produce a finish in which light refraction causes objectionable cloudy spots. It has also been determined by measurement that the ledger knife 28 remains three to four degrees cooler due to the increased in-draft of air produced by my improved cutter, thus resulting in less wear on the knives and requiring less oil to keep the knives cool together with less possibility of oil spots on the cloth. These superior results are not only apparent in the product sheared by my improved cutter but the improved fibre manipulating functions above described have been proven through the use of smoke tests and high speed photography in the actual fibre shearing operation of both forms of cutters, and these results show up particularly in the finished garments and very substantially enhance the quality and value of the product.

In FIGS. 3 and 4 I have illustrated a modified construction comprising a tubular member 40 mounted for rotation at its ends in bearing supports 42. This member includes inclined risers 44, channels 46, between the risers and shearing blades 48 disposed therealong as above described in reference to shearing member 14. It furthermore includes an axial port 50 thereinto and therethrough together with openings 52 in the channels 46. Connections 54 and 56 are provided at one bearing support 42 for connection with a vacuum exhausting source whereby air can be drawn outwardly from the port 50 and inwardly through the openings 52. As previously explained, efficient operation of the shearing function is greatly facilitated by fully lifting the fibers in the shearing area. The function served by providing such flow of air currents inwardly from the channels 46 through the openings 52 is to further increase this fiber lifting function and thus increase the efficiency of the shearing operation.

The shearing member can be constructed from a single tubular piece as above described or the risers can be constructed as independent units and assembled on a supporting shaft. In FIG. 5 I have illustrated such an assembly including a shaft 60 having assembled in spaced relation thereon a plurality of risers 62 and blades 64. The risers are constructed to slide onto and along the shaft and are held in the required spaced relation by bushings 66 therebetween. Otherwise the construction and operation are substantially as above described.

Having thus disclosed my invention what I claim as new and desire to secure by Letters Patent is:

1. A rotary fiber lifting and shearing unit comprising a relatively long cylindrical member having a plurality of spaced annular risers thereon and therealong, the risers extending entirely around the member in planes inclined between the longitudinal axis of the member and a radius therethrough and providing inclined and continuous annular channels between the risers, and a plurality of shearing blades on and extending longitudinally of the member about its periphery and supported in slots in the risers and in spaced relation from each other and from the bottoms of the channels.

2. The rotary shearing unit defined in claim 1 in which the inclined risers are in parallel relation.

3. The rotary shearing unit defined in claim 1 in which said cylindrical member is of tubular construction providing a port longitudinally therein and is provided with openings extending from the port to said channels for conducting fiber lifting currents of air inwardly through said openings from the channels to the port.

References Cited in the file of this patent

UNITED STATES PATENTS

| | | |
|---|---|---|
| 761,808 | Allen | June 7, 1904 |
| 2,265,281 | Hale | Dec. 9, 1941 |
| 2,606,355 | Richardson | Aug. 12, 1952 |
| 2,695,438 | Bejeuhr | Nov. 30, 1954 |

FOREIGN PATENTS

| | | |
|---|---|---|
| 539,392 | Germany | Nov. 25, 1931 |